United States Patent
Xu et al.

(10) Patent No.: US 9,008,154 B2
(45) Date of Patent: *Apr. 14, 2015

(54) METHOD AND SYSTEM FOR BLIND INTERFERENCE CANCELLATION IN A WIRELESS COMMUNICATION SYSTEMS

(71) Applicant: Shanghai Mobilepeak Semiconductor Co., Ltd., Shanghai (CN)

(72) Inventors: Weiping Xu, Shanghai (CN); Feng Wan, Shanghai (CN); Liang Xu, Shanghai (CN); Yuan Li, Shanghai (CN); Qiuzhen Zou, Shanghai (CN)

(73) Assignee: Shanghai Mobilepeak Semiconductor Co., Ltd., Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/078,479

(22) Filed: Nov. 12, 2013

(65) Prior Publication Data

US 2014/0133523 A1  May 15, 2014

(30) Foreign Application Priority Data

Nov. 13, 2012 (CN) .................. PCT/CN2012/084511

(51) Int. Cl.
 *H04B 1/00* (2006.01)
 *H04B 1/7103* (2011.01)
 *H04B 1/711* (2011.01)
 *H04B 1/712* (2011.01)

(52) U.S. Cl.
 CPC .............. *H04B 1/7103* (2013.01); *H04B 1/711* (2013.01); *H04B 1/712* (2013.01)

(58) Field of Classification Search
 USPC ................ 375/130, 147–148, 260, 316, 340, 375/346–350; 370/335, 342
 See application file for complete search history.

(56) References Cited

U.S. PATENT DOCUMENTS

| 7,180,969 | B1 | 2/2007 | Erving et al. |
| 2012/0076248 | A1* | 3/2012 | Rosenqvist .................. 375/346 |
| 2013/0344909 | A1* | 12/2013 | Davydov et al. ............. 455/501 |

(Continued)

FOREIGN PATENT DOCUMENTS

| CN | 101588190 A | 11/2009 |
| CN | 102594491 A | 7/2012 |

(Continued)

*Primary Examiner* — Khanh C Tran
(74) *Attorney, Agent, or Firm* — Kilpatrick Townsend & Stockton LLP

(57) ABSTRACT

Aspects of the present invention include methods, systems, and computer-readable medium for canceling interference in wireless communication. The method includes receiving wireless CDMA communication signals using one or more antennas at least from a first entity via a first communication channel and a second entity via a second communication channel, determining a set of known characteristics associated with the first entity, the first set of characteristics comprising a first signal strength, a first synchronization information, and an first channel identification information, and determining an aggregate signal matrix based on signals received from at least the first entity and the second entity. The method further includes determining a covariance matrix associated with the aggregate signal value, determining a reference signal matrix based on the set of known characteristics, calculating an interference matrix by subtracting the reference signal matrix from the covariance matrix, and removing the interference estimation from the communication signals.

12 Claims, 10 Drawing Sheets

(56) References Cited

U.S. PATENT DOCUMENTS

2014/0064109 A1* 3/2014 Krishnamurthy ............ 370/252
2014/0160949 A1* 6/2014 Clausen et al. ............... 370/252

FOREIGN PATENT DOCUMENTS

| WO | 2007/003680 A1 | 1/2007 |
| WO | 2009032649 A1 | 3/2009 |

* cited by examiner

METHOD AND SYSTEM FOR BLIND INTERFERENCE CANCELLATION IN A WIRELESS COMMUNICATION SYSTEMS

CROSS REFERENCE TO RELATED APPLICATIONS

The present application claims priority to PCT application No. PCT/CN2012/084511, filed on Nov. 13, 2012, and entitled "Method and System for Blind Interference Cancellation in a wireless communication systems", the entire disclosure of which is incorporated herein by reference.

BACKGROUND

Currently, there are two main types of interference cancellation receivers. Namely, linear minimal mean square error (LMMSE) based interference cancellation receivers and non-linear interference cancellation (NLJC) receivers. LMMSE based interference cancellation receivers estimate the covariance matrix and find the coefficient which is used to achieve the MMSE by solving the large matrix inversion. The minimal required pre-knowledge to use this algorithm in CDMA based communication systems is the desired signal's scrambling and spread code. The NIX based interference cancellation receivers estimate interference items and subtract such items from the received signal in parallel or successively.

These techniques reconstruct the interference items by estimating each interference's amplitude, timing, channel response, and information bit and then remove them from the received signal, based on the pre-knowledge of the desired signal and interference's scrambling and spread codes. Specifically, in wide-band code division multiple access (CDMA) (WCDMA) downlink, the knowledge of variable spreading factors and spread codes of intra-channel and inter-channel interferences is very limited, and an additional algorithm is needed to detect the presence of the interferences.

A significant drawback of these existing interference cancellation techniques is that they require computational complexity and have high requirement for the accuracy of the estimated interference signal in the NLIC receivers. Hence, for these and other reasons, improvements are needed in the art.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer similar components. In some instances, a sub-label is associated with a reference numeral to denote one of multiple similar components. When reference is made to a reference numeral without specification to an existing sub-label, it is intended to refer to all such multiple similar components.

SUMMARY OF THE INVENTION

Figure 1:
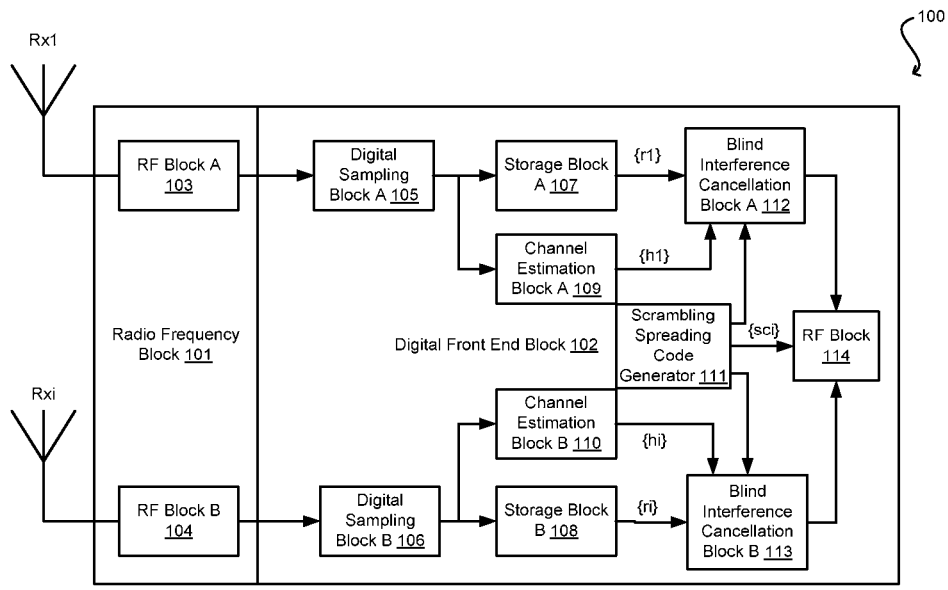
FIG. 1 illustrates a block diagram of a receiver with blind interference cancellation, according to one embodiment of the present invention.

The present invention is related to a method for canceling interference in wireless communication. The method includes receiving wireless code division multiple access (CDMA) communication signals using one or more antennas at least from a first entity via a first communication channel and a second entity via a second communication channel, determining a set of known characteristics associated with the first entity, the first set of characteristics comprising a first signal strength, a first synchronization information, and an first channel identification information, and determining aggregate signal matrix based on signals received from at least the first entity and the second entity. The method further includes determining a covariance matrix associated with the aggregate signal value, determining a reference signal matrix based on the set of known characteristics, and calculating an interference matrix by subtracting the reference signal matrix from the covariance matrix. Furthermore, the method includes determining a maximum eigenvalue and an eigenvector corresponding to the maximum eigenvalue for with the interference matrix, generating an interference estimation using the maximum eigenvalue and the eigenvector, and removing the interference estimation from the communication signals.

The method also includes performing recursive calculations with a threshold condition to determine the maximum eigenvalue. The threshold is determined based on a desired signal-to-noise ratio and the correlation feature of the designed signature code. Also, the channel identification information comprises a signature (spreading) code, scrambling code, in orthogonal code, or non-orthogonal. The reference signal matrix is associated with covariance values of the set of known characteristics, and the wireless communication CDMA signals includes interference signals.

In a further embodiment, a system for canceling interference in wireless communication, is described. The system includes a storage device, a common reference timing, and a processor in communication with the storage device. There are two types of storage devices: instruction memory block and data memory block. The former storage device has sets of instructions stored thereon which, when executed by the processor, cause the processor to: receive wireless code division multiple access (CDMA) communication signals using one or more antennas at least from a first entity via a first communication channel and a second entity via a second communication channel, called reference channel, and other entities via all other available communication channels and save to the data storage device at a preset time. The processor will process these saved data offline to: determine a set of known characteristics associated with the first entity, the first set of characteristics comprising a first signal strength, a first synchronization information, and an first channel identification information, and determine an aggregate signal matrix based on signals received from at least the first entity and the other related entities.

The sets of instructions further cause the processor to determine a covariance matrix associated with the aggregate signal value, determine a reference signal matrix based on the set of known characteristics, calculate an interference matrix by subtracting the reference signal matrix from the covariance matrix, determine a maximum eigenvalue and an eigenvector corresponding to the maximum eigenvalue for with the interference matrix, generate an interference estimation using the maximum eigenvalue and the eigenvector, and remove the interference estimation from the communication signals.

Further, another embodiment describes a hardware processing accelerator to complete all the above interference estimation and cancellation process. Further, another embodiment describes a computer-readable medium for updating user assistance content. The computer-readable medium has sets of instructions stored thereon which, when executed by a computer, cause the computer to: receive wireless code division multiple access (CDMA) communication signals using one or more antennas at least from a first entity via a first communication channel, a second entity via a second communication channel and so on, determine a set of known characteristics associated with the first entity, the first set of characteristics comprising a first signal strength, a first synchronization information, and an first channel identification information, determine an aggregate signal matrix based on signals received from at least the first entity and the second entity, determine a covariance matrix associated with the aggregate signal value, determine a reference signal matrix based on the set of known characteristics, calculate an interference matrix by subtracting the reference signal matrix from the covariance matrix, determine a maxim urn eigenvalue and an eigenvector corresponding to the maximum eigenvalue for with the interference matrix, generate an interference estimation using the maximum eigenvalue and the eigenvector, and remove the interference estimation from the communication signals.

DETAILED DESCRIPTION OF THE INVENTION

While various aspects of embodiments of the invention have been summarized above, the following detailed description illustrates exemplary embodiments in further detail to enable one of skill in the art to practice the invention. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. Several embodiments of the invention are described below and, while various features are ascribed to different embodiments, it should be appreciated that the features described respect to one embodiment may be incorporated with another embodiment as well. By the same token, however, no single feature or features of any described embodiment should be considered essential to the invention, as other embodiments of the invention may omit such features.

Aspects of the present invention relate to inter symbol interference cancellation and channel equalizer. Removing interferences includes symbol level inter-interference and intra-interference cancellation (e.g., blind interference cancellation). Aspects of the invention further includes chip level inter symbol interference cancellation and channel equalization, time tracking on the reference channel by analyzing the equalizer channel profile, estimate the equalizer coefficient on the reference channel, applying the equalizer coefficient on all channels associated with the desired user, and dynamically selecting the combination of the symbol level inter-interference and intra-interference cancellation and chip level equalizer based on the interference detection and the output signal-to-noise ratio.

Further aspects of the present invention relate to interference cancellation of wireless communication systems, and specifically to CDMA based mobile communication systems (i.e., WCDMA) which are particularly applied in a universal mobile telecommunications system (UMTS) terrestrial radio access-frequency division duplexing (UTRA-FDD) downlink receiver to cancel the intra-cell interference, and inter-cell interference, and mitigate inter symbol interference (ISI) interference.

Instead of estimating an interference signal, the present invention blindly cancels interferences in succession based on second order statistics to avoid the computational complexity. The most dominant interference contribution to the received covariance matrix is first estimated and then removed from the receiving vector. Then, the weaker interferences are removed in succession by repeating this process. The desired signal will be detected after each of the significant interference items are removed. The estimation of the interference contribution to the received covariance matrix can be implemented by using subspace technique to project the interference on the maximum eigenvalue and its corresponding maximum eigenvector.

Furthermore, the present invention provides improved performance by adding the interference cancellation and thus increasing the data rate. Further, the effect of signal covariance matrix estimation errors are mitigated. The computational complexity is decreased by removing the block to detect unknown interferences. Processing delay is reduced by removing the interference reconstruction from the decision feedback. As such, the present invention increases calculation speed without sacrificing accuracy in order to solve inter-cellular and intra-cellular interferences.

Referring now to FIG. 1 which a system 100 of a receiver with blind interference cancellation, according to one embodiment of the present invention. In one embodiment, the system 100 includes a radio frequency block 101 in communication with a digital front end block 102. Radio frequency block 101 includes an RF block A 103 and RF block B 104, which receive radio frequencies Rx1 and Rxi, respectively.

Digital front end block 102 includes a digital sampling block A 105 which receives input from RF block A 103 and a digital sampling block B 106 which receives input from RF block B 104. Further, digital front end block 102 includes a storage block A 107, a channel estimation block A 109, a storage block B 108, and a channel estimation block B 110.

Storage block A 107, channel estimation block A 109 receive inputs from digital sampling block A 105, and storage block B 108, channel estimation block B 110 receive inputs from digital sampling block B 106. Accordingly, storage block A 107 and storage block B 108 store the received signals, and channel estimation block A 109 and channel estimation block B 110 perform channel estimation based on the received signals.

A scrambling spreading code generator 111 is in communication with channel estimation block A 109 and channel estimation block B 110. Then, a blind interference cancellation block A 112 receives {r1} from storage block A 107, {h1} from channel estimation block A 109, and an input from scrambling spreading code generator 111. Further, a blind interference cancellation block B 113 receives {ri} from storage block B 108, {hi} from channel estimation block B 110, and an input from scrambling spreading code generator 111. Furthermore, a RF block 114 receives input from blind interference cancellation block A 112, blind interference cancellation block B 113, and {sci} from scrambling spreading code generator 111.

Figure 2:
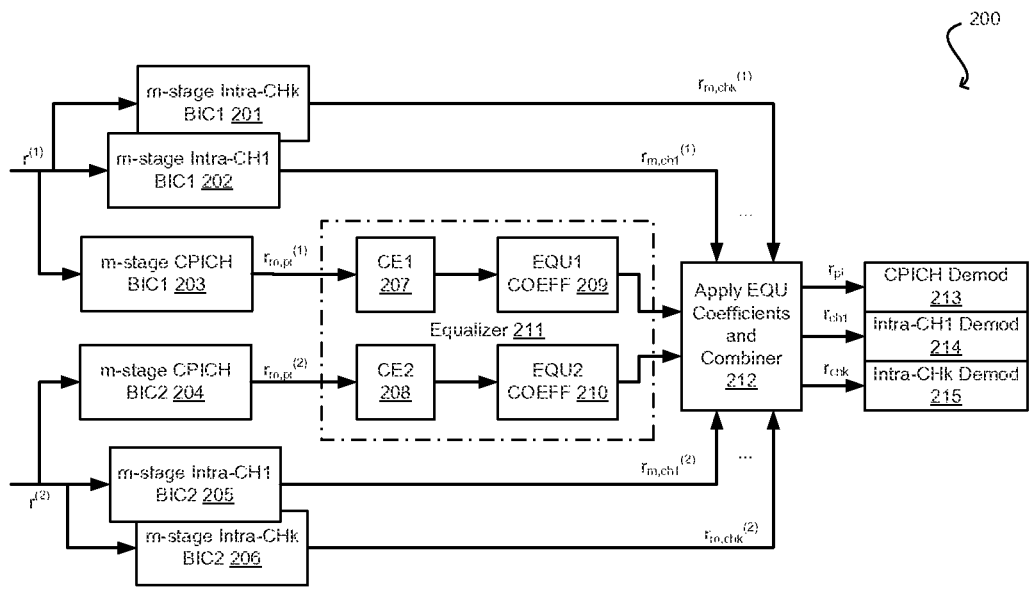
FIG. 2 illustrates a block diagram of intra-interference and inter-interference cancellation and channel equalization, according to one embodiment of the present invention.

Turning now to FIG. 2, which is block diagram illustrating a system 200 for implementing intra-interference and inter-interference cancellation and channel equalization, according to one embodiment of the present invention. In one embodiment, system 200 includes a m-stage intra-CHk blind interference cancellation (BIC) 201, an m-stage intra-CH1 BIC1 202, and a m-stage CPICH BIC1 203, each of which receive input from $r^{(1)}$. Furthermore, m-stage intra-CHk BIC2 206, an m-stage intra-CH1 BIC2 205, and a m-stage CPICH BIC2 204, each of which receive input from $r^{(2)}$.

In a further embodiment, system 200 includes an equalizer 211 which includes a channel equalizer (CE)1 207 in communication with an equation (EQU)1 coefficient (COEFF) 209, and a CE2 208 in communication with an EQU2 COEFF 210. Further, CE1 207 receives input $r_{m,pi}^{(1)}$ from m-stage CPICH BIC1 203, and CE2 208 receives input $r_{m,pi}^{(2)}$ from m-stage CPICH BIC1 204.

System 200 further includes an apply EQU coefficients and combiner 212 which receives input $r_{m,chk}^{(1)}$ from m-stage intra-CHk BIC1 201, input $r_{m,ch1}^{(1)}$ from m-stage intra-CH1 BIC1 202, input $r_{m,ch1}^{(2)}$ from m-stage intra-CH1 BIC2 205, and input $r_{m,chk}^{(2)}$ from m-stage intra-CHk BIC2 206. apply EQU coefficients and combiner 212 also received input from EQU1 COEFF 209 and EQU2 COEFF 210. apply EQU coefficients and combiner 212 then processes the inputs and outputs $r_{pi}$, $r_{ch1}$, and $r_{chk}$ to CPICH demod 213, intra-CH1 demod 214, and inta-CHk demod 215, respectively.

In one embodiment, in system 200 the received high-speed downlink packet access (HSDAP) signal of the serving cell includes the synchronous intra-cell channels and the asynchronous inter-cell interferences. The HSDAP received signal on the $p^{th}$ branch on symbol level is simplified as:

$$r^{(p)} = \sum_{k=0}^{K-1} \sum_{ch=0}^{CH-1} \sum_{l=0}^{L-1} h_{k,ch,l}^{(p)} d_{k,ch,l} \sum_{n=0}^{N_{k,ch}-1} SC_{ch,n+l} \qquad \text{Equation 1}$$

where SC is the equivalent spreading code combined by the scrambling code and the orthogonal spreading code. The scrambling codes are used to identify cells, indexed by k, and in each cell the intra-cell channels are identified by orthogonal spreading code, indexed by ch. FIG. 2 demonstrates a single input, multiple outputs (SIMO) system where there are two receiving branches. The received signal on each branch is modeled first as passing to a multi-path channel and the channel h is assumed not changing for the duration of a symbol l is used to index the multi-path. Then ISI will be removed by the equalizer after the multi-stage blind interference cancellation. The equalizer coefficients will be obtained from common pilot channel (CPICH) and applied on all intra-channels.

Figure 3:
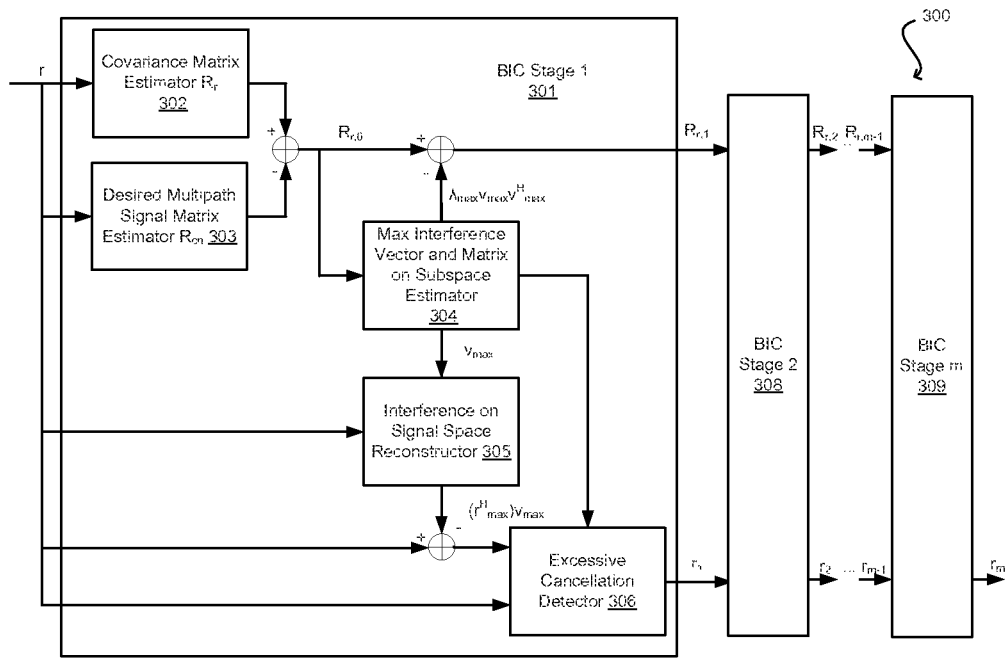
FIG. 3 illustrates a block diagram of blind interference cancellation on each channel, according to one embodiment of the present invention.

Turning next to FIG. 3 which illustrates a block diagram of a system 300 for implementing blind interference cancellation on each channel, according to one embodiment of the present invention. In one embodiment, system 300 includes a BIC state 1 301, which includes a covariance matrix estimator $R_r$ 302, a desired multipath signal matrix estimator $R_{ch}$ 303, a max interference vector and matrix on subspace estimator 304, an interference on signal space reconstructor 305, and an excessive cancellation detector 306.

The Outputs $R_{r,1}$ and $r_1$ from BIC state 1 301 are received by a BIC stage 2 308 and then outputs $R_{r,2}$ to $R_{r,m-1}$ and $r_2$ to $r_{m-1}$ are received by BIC stage m 309. Then, BIC stage m 309 outputs $r_m$.

In one embodiment, the following the multi stage blind interference cancellation block may be implemented using system 300 in FIG. 3. The received signal vector with a length of $N_{ch}$ chips at symbol i is noted as r(i), where $N_{ch}$ usually is the spreading factor of the channel. Note that the maximum number of interference components may be detected and cancelled usually meets the following relations: $N_{ch} \geq 2K_a + K_s + 1$, where $K_a$ is the total number of asynchronous interference items and $K_s$ is the total number of synchronous interference items. The receiving signal covariance matrix can be estimated directly from the received signal sample or channel estimation. Equation 2 is a typical sample estimation with the estimation window size of N:

$$R_r(i) = \frac{1}{N} \sum_{j=i*N_{ch}-N+1}^{i*N_{ch}} r(j)r^H(j) \qquad \text{Equation 2}$$

The desired multipath signal matrix is estimated as:

$$\hat{R}_{ch}(i) = \sum_{l=0}^{L-1} |\hat{h}_l(i)|^2 SC_{ch}(iN_{ch}-l) SC_{ch}^H(iN_{ch}-l) \qquad \text{Equation 3}$$

where H is Hermitian conjugation operation, the channel estimation on symbol level h can simply use the finger output of RAKE receiver and is not the key focus of this invention. Dropping the symbol index i for simplification, the interference covariance matrix can be obtained by removing the desired signal as:

$$\hat{R}_{r,0} = \hat{R}_r - \hat{R}_{ch} \qquad \text{Equation 4}$$

The mean energy (ME) of the received signal r on the $N_{ch}$-dimensional vector space u is defined as ME(u)= $E\{(r^H u)^2\}$, where $u^H u=1$. According to linear algebra theory, the eigenvalue λ and the corresponding eigenvector v is the necessary condition to maximize ME(v) as $R_r v = \lambda v$. For a set of eigenvalue and the corresponding eigenvector of $R_r$, ME(V)=$V^H R_r V$=D, where D=diag$\{\lambda_n\}$, n=0 ... $N_{ch}$-1 and V is the Eigen-matrix consist of $N_{ch}$ orthogonal Eigenvectors. Therefore the eigenvector corresponding to the maximum eigenvalue is the vector that maximizes the mean energy on it. The next step is to remove the maximum interference contribution in the interference covariance matrix in stage m by applying this subspace theory as:

$$\hat{R}_{r,m} = \hat{R}_{r,m-1} - \lambda_{max}^{(m)} v_{max}^{(m)} v_{max}^{H(m)} \quad \text{Equation 5}$$

To find the maximum eigenvalue $\lambda_{max}$ and the corresponding Eigenvector $v_{max}$. The Eigen-decomposition in full is not needed. Instead an iterative solution like power method (PM) can be used. The iteration algorithm to obtain the maximum eigenvalue $\lambda_{max}$ and the corresponding Eigenvector $v_{max}$ is not the key topic in this invention. The excessive cancellation detector in stage m can be implemented by a threshold, which is associated with the signal-to-noise ratio and the correlation feature of the combined spreading code, check as:

$$w_m = (SC_{ch}^H v_{max}^{(m)} > \text{Threshold})?0:1 \quad \text{Equation 6}$$

The cleaner signal will feed to the next stage when $w_m=1$ else stop.

$$\hat{r}_m = r_{m-1} - w \cdot (r_{m-1}^H v_{max}^{(m)}) v_{max}^{(m)} \quad \text{Equation 7}$$

where $r_0 = r$.

In UTRA-FDD downlink, the CPICH can be used to calculate the channel equalizer coefficients and the coefficients will apply on each channel after performing multi-stage blind interference cancellation on each channel to remove ISI. The equalizer can be implemented in time domain or frequency domain based on the signal covariance matrix estimation and is not the main focus in this invention.

Figure 4:
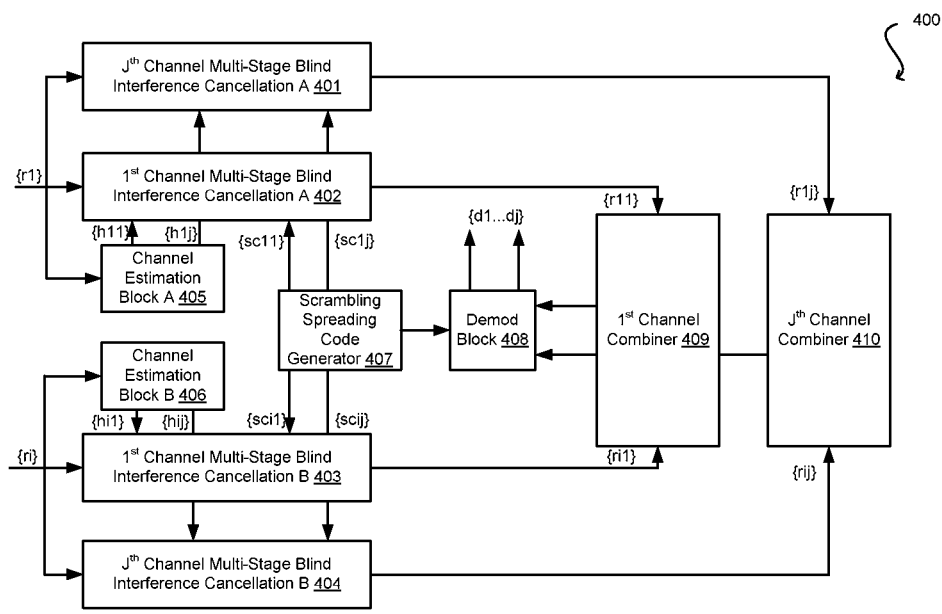
FIG. 4 illustrates a block diagram of multi-channel/multi-stage blind interference cancellation, according to one embodiment of the present invention.

Referring next to FIG. 4 which illustrates a system 400 for implementing multi-channel multi-stage blind interference cancellation, according to one embodiment of the present invention. In one embodiment, system 400 includes a $J^{th}$ Channel Multi-Stage Blind Interference Cancellation A 401, a $1^{st}$ Channel Multi-Stage Blind Interference Cancellation A 402, and a channel estimation block A 405, which each receive input {r1}. Further, a $J^{th}$ Channel Multi-Stage Blind Interference Cancellation B 404, a $1^{st}$ Channel Multi-Stage Blind Interference Cancellation B 403, and a channel estimation block B 406, each receive input {ri}.

Channel estimation block A 405 provides input {h11} to $1^{st}$ Channel Multi-Stage Blind Interference Cancellation A 402 and input {h1} to $J^{th}$ Channel Multi-Stage Blind Interference Cancellation A 401. Further, channel estimation block B 406 provides input {hi1} to $1^{st}$ Channel Multi-Stage Blind Interference Cancellation B 403 and input {hij} to Channel Multi-Stage Blind Interference Cancellation B 404.

System 400 further includes a scrambling spreading code generator 407 which provides input {sc11} to $1^{st}$ Channel Multi-Stage Blind Interference Cancellation A 402 and input {sc1j} to $J^{th}$ Channel Multi-Stage Blind Interference Cancellation A 401, as well as input {sci1} to $1^{st}$ Channel Multi-Stage Blind Interference Cancellation B 403 and input to {scij} to $J^{th}$ Channel Multi-Stage Blind Interference Cancellation B 404. scrambling spreading code generator 407 also provides input to a demod block 408, and demod block 408 outputs {d1 to dj}.

Furthermore, $J^{th}$ Channel Multi-Stage Blind Interference Cancellation A 401 outputs {r1j} to a $J^{th}$ Channel Combiner 410 and $J^{th}$ Channel Multi-Stage Blind Interference Cancellation B 404 also outputs {rij} to $J^{th}$ Channel Combiner 410. $1^{st}$ Channel Multi-Stage Blind Interference Cancellation A 402 outputs {r11} to $1^{st}$ Channel Combiner 409 and $1^{st}$ Channel Multi-Stage Blind Interference Cancellation B 403 outputs {ri1} to $1^{st}$ Channel Combiner 409. Further, $1^{st}$ Channel Combiner 409 and $J^{th}$ Channel Combiner 410 provide output to demod block 408.

Figure 5A:
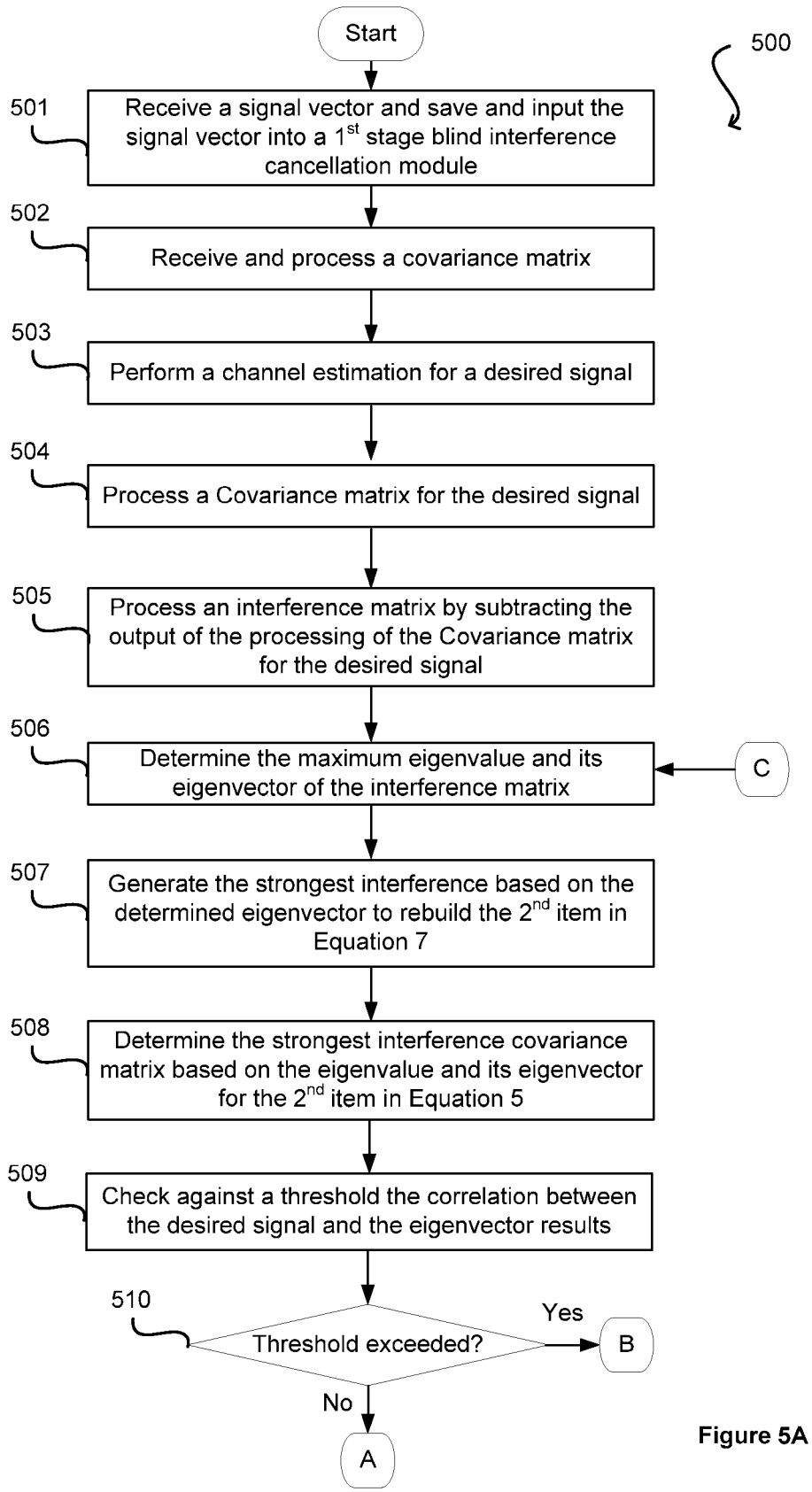
FIGS. 5A and 5B illustrates flow diagrams for implementing blind interference cancellation, according to one embodiment of the present invention.
Figure 5B:
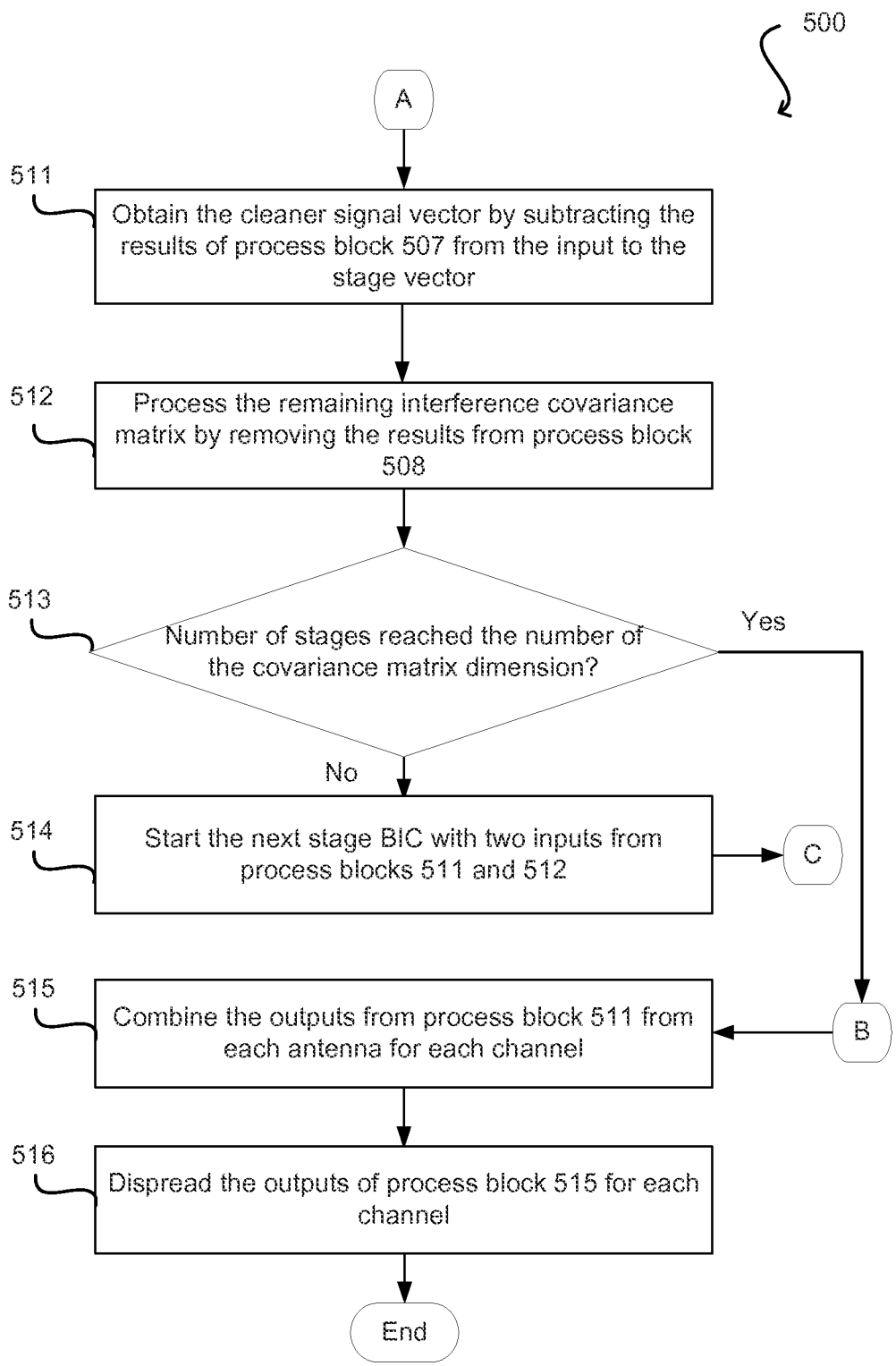

FIGS. 5A and 5B illustrates a method 500 for implementing blind interference cancellation, according to one embodiment of the present invention. In one embodiment, method 500 may be implemented using any one of systems 100, 200, 300, or 400. At process block 501, a signal vector is received and saved. The signal vector is then input into a 1st stage blind interference cancellation module. At process block 502, a covariance matrix is received and processed.

At process block 503, a channel estimation for a desired signal is performed and a covariance matrix for the desired signal is processed (process block 504). At process block 505, an interference matrix is processed by subtracting the output of the processing of the covariance matrix for the desired signal. Then, the maximum eigenvalue and its eigenvector of the interference matrix is determined (process block 506).

At process block 507, the strongest interference based on the determined eigenvector is generated to rebuild the $2^{nd}$ item in Equation 7. The strongest interference covariance matrix is determined based on the eigenvalue and its eigenvector for the $2^{nd}$ item in Equation 5 (process block 508). Then, at process block 509, a threshold is checked against the correlation between the desired signal and the eigenvector results.

If the threshold is not exceeded, then the process moves to point 'A', otherwise the process moves to point 'B' and on to process block 515. Turning now to FIG. 5B from point 'A', at process block 511, a cleaner signal vector is obtained by subtracting the results of process block 507 from the input to the stage vector.

A determination is made whether the number of stages has reached the number of the covariance matrix dimension (decision block 512). If the number of stages has not reached the number of the covariance matrix dimensions, then at process block 513, the remaining interference covariance matrix is processed by removing the results from process block 508. At process block 514, the next stage BIC is stared with two inputs from process blocks 511 and 513. Then, the process returns to process block 506 via point 'C'. Otherwise, the process proceeds to point 'B' and process block 515. At process block 515, the outputs from process block 511 from each antenna for each channel are combined. At process block 516, the outputs of process block 515 for each channel are dispread.

One implementation of the method 500 includes calculating (2×2) covariance matrix (it should be noted that the larger the dimension of the covariance matrix, the more interference items can be detected and further cancelled, and usually the size of the covariance matrix is equivalent to the length of each CDMA channel's spreading code).

In one embodiment, the desired signal's signature code in one symbol for the desired user is:

$$s_0 = [1\ 1]^T,$$

the interference's item is:

$$s_1 = [1\ -1]^T$$

the covariance matrix for the received signal is:

$$R = \begin{bmatrix} 2.1 & 0 \\ 0 & 0.1 \end{bmatrix},$$

with a variance of normal additive noise is estimated at 0.1. the covariance matrix for the desired user is estimated perfectly as:

$$R_0 = \begin{bmatrix} 0.5 & 0.5 \\ 0.5 & 0.5 \end{bmatrix}$$

the covariance matrix after being removed, the desired user's contribution (interference and noise) will be:

$$R_{r0} = \begin{bmatrix} 1.6 & -0.5 \\ -0.5 & -0.4 \end{bmatrix}.$$

the max Eigenvalue and corresponding Eigenvector will be:

$$\lambda_{max} = 1.718 \text{ and } v_{max} = [-0.9732 \; 0.2298]^T.$$

The rebuild interference $\hat{s}_1 = [1.9337 \; -0.4565]$ and the cleaner signal after interference remove will be $\hat{s}_0 = [0.0915 \; 0.3875]^T$ and the estimated symbol will be detected as 1 as expected.

Figure 6:
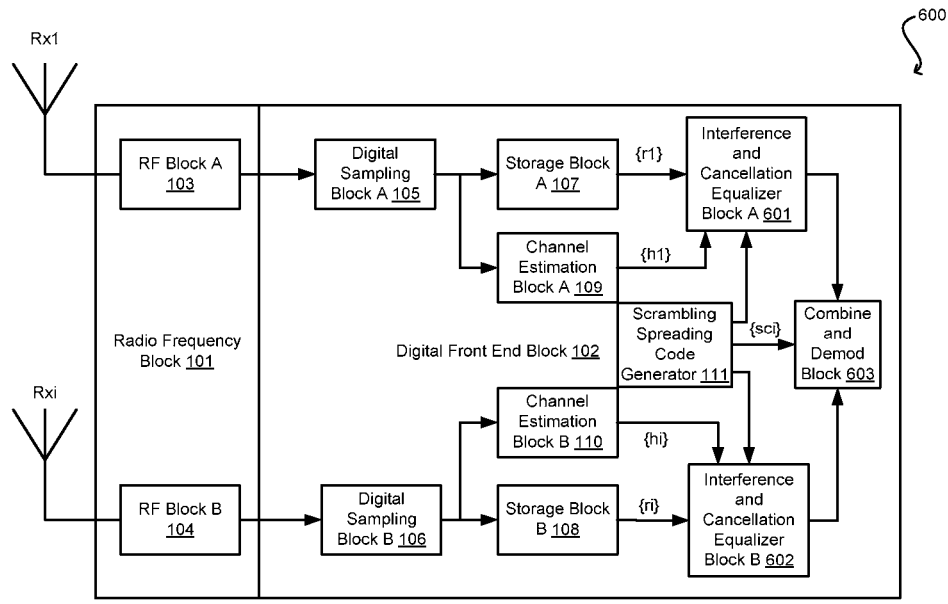
FIG. 6 illustrates a block diagram of a receiver with an interference cancellation and equalizer according to one embodiment of the present invention.

Turning now to FIG. 6 which illustrates a system 600 of a receiver with an interference cancellation and equalizer, according to one embodiment of the present invention. In one embodiment, system 600 includes similar elements of FIG. 1 with the Interference and Cancellation Equalizer Block A 601, Interference and Cancellation Equalizer Block B 602, and Combine and Demod Block 603, which replace Blind Interference Cancellation Block A 112, Blind Interference Cancellation Block B 113, and RF block 114.

Figure 7:
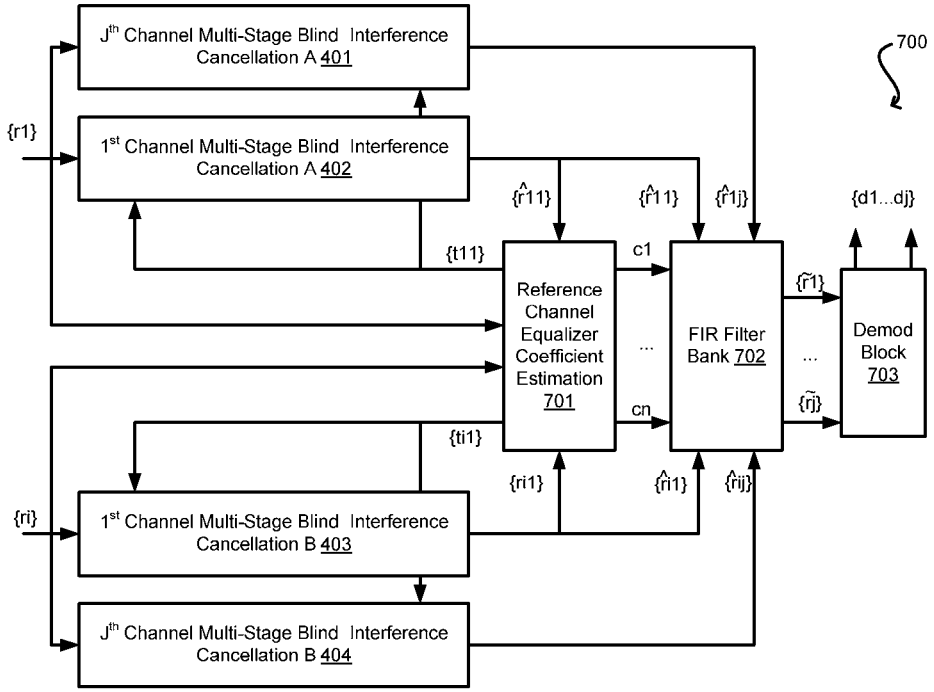
FIG. 7 illustrates a block diagram of multi-channel interference cancellation and equalizer, according to one embodiment of the present invention.

Turning next to FIG. 7 which illustrates a system 700 for implementing multi-channel interference cancellation and equalizer, according to one embodiment of the present invention. In one embodiment, system 700 includes the elements of FIG. 4 with a Reference Channel Equalizer Coefficient Estimation 701, a finite impulse response (FIR) Filter Bank 702, and Demod Block 703, which replace Demod Block 408, 1st Channel Combiner 409, and $J^{th}$ Channel Combiner 410.

Figure 8:
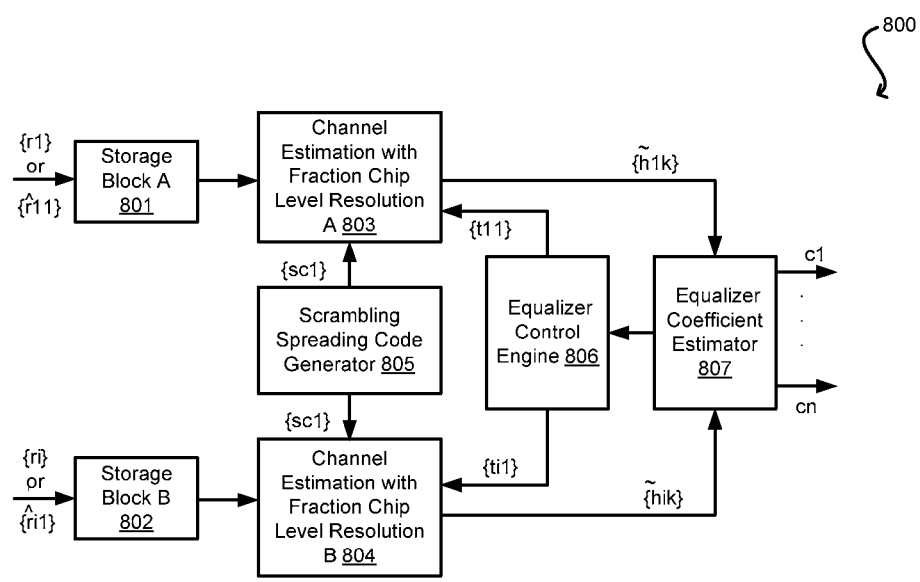
FIG. 8 illustrates a block diagram of self-tracking multi channel equalizer based on a pilot channel, according to one embodiment of the present invention.

FIG. 8 illustrates a system 800 for implementing a self-tracking multi-channel equalizer based on a pilot channel, according to one embodiment of the present invention. In one embodiment, system 800 includes a storage block A 801 which receives input $\{r1\}$ or $\{r11\}$. System 800 further includes a storage block B 802 which receives input or $\{ri\}$ or $\{ri1\}$. System 800 further includes a Channel Estimation with Fraction Chip Level Resolution A 803 and Channel Estimation with Fraction Chip Level Resolution B 804, which receives input from storage block A 801 and storage block B 802, respectively.

System 800 further includes a Scrambling Spreading Code Generator 805 which sends output $\{sc1\}$ to Channel Estimation with Fraction Chip Level Resolution A 803 and output $\{cs1\}$ to Channel Estimation with Fraction Chip Level Resolution B 804. Furthermore, Channel Estimation with Fraction Chip Level Resolution A 803 receives input $\{t11\}$ from an Equalizer Control Engine 806 and Channel Estimation with Fraction Chip Level Resolution B 804 receives an input $\{ti1\}$ from Equalizer Control Engine 806.

System 800 further includes an Equalizer Coefficient Estimator 807 which receives input $\{h1k\}$ from Channel Estimation with Fraction Chip Level Resolution A 803 and input $\{hik\}$ from Channel Estimation with Fraction Chip Level Resolution B 804. Further, Equalizer Coefficient Estimator 807 outputs c1 to en.

Figure 9:
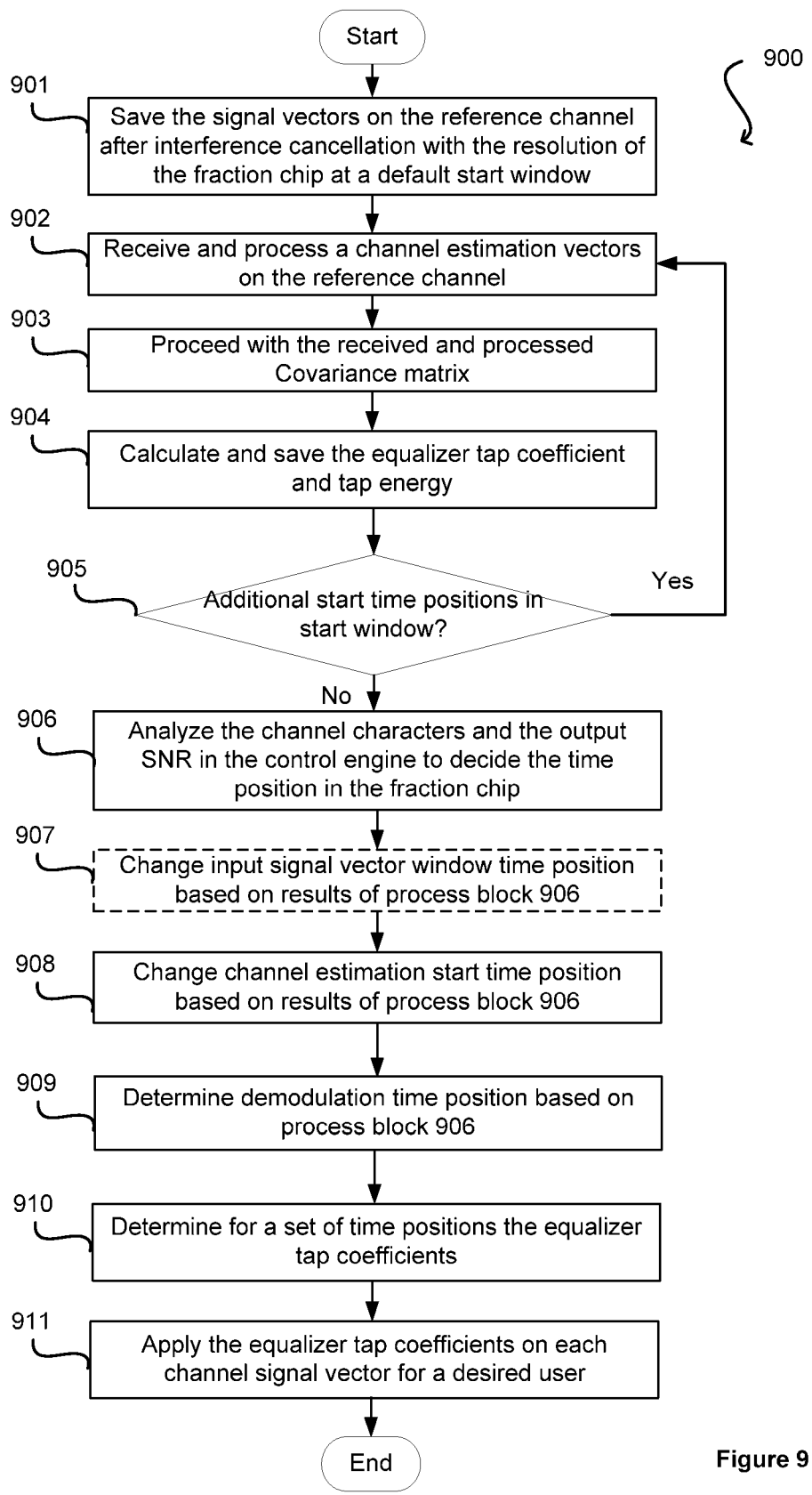
FIG. 9 illustrates a flow diagram for combining symbol level interference cancellation and chip level channel equalizer, according to one embodiment of the present invention.

Referring now to FIG. 9 which illustrates a method 900 for combining symbol level interference cancellation and chip level channel equalizer, according to one embodiment of the present invention. At process block 901, the signal vectors are saved on the reference channel after interference cancellation or with the resolution of the fraction chip. A covariance matrix is then received and processed (process block 902).

At process block 903, the received and processed Covariance matrix is used, and the equalizer tap coefficient and tap energy are calculated and saved (process block 904). At decision block 905, a determination is made whether additional start time positions are in start window. If there are additional start time positions in the start window, then the process returns to process block 902. Otherwise the process continues to process block 906, which analyzes the channel characters and the output signal-to-noise ratio (SNR) in the control engine to decide the time position in the fraction chip.

At process block 907, the input signal vector window time position may be changed based on results of process block 906. Then, the channel estimation start time position is changed based on results of process block 906 (process block 908). At process block 909, the demodulation time position is determined based on process block 906. Then, a determination for a set of time positions the equalizer tap coefficients is made (process block 910). At process block 911, the equalizer tap coefficients are applied on each channel signal vector for a desired user.

Figure 10:
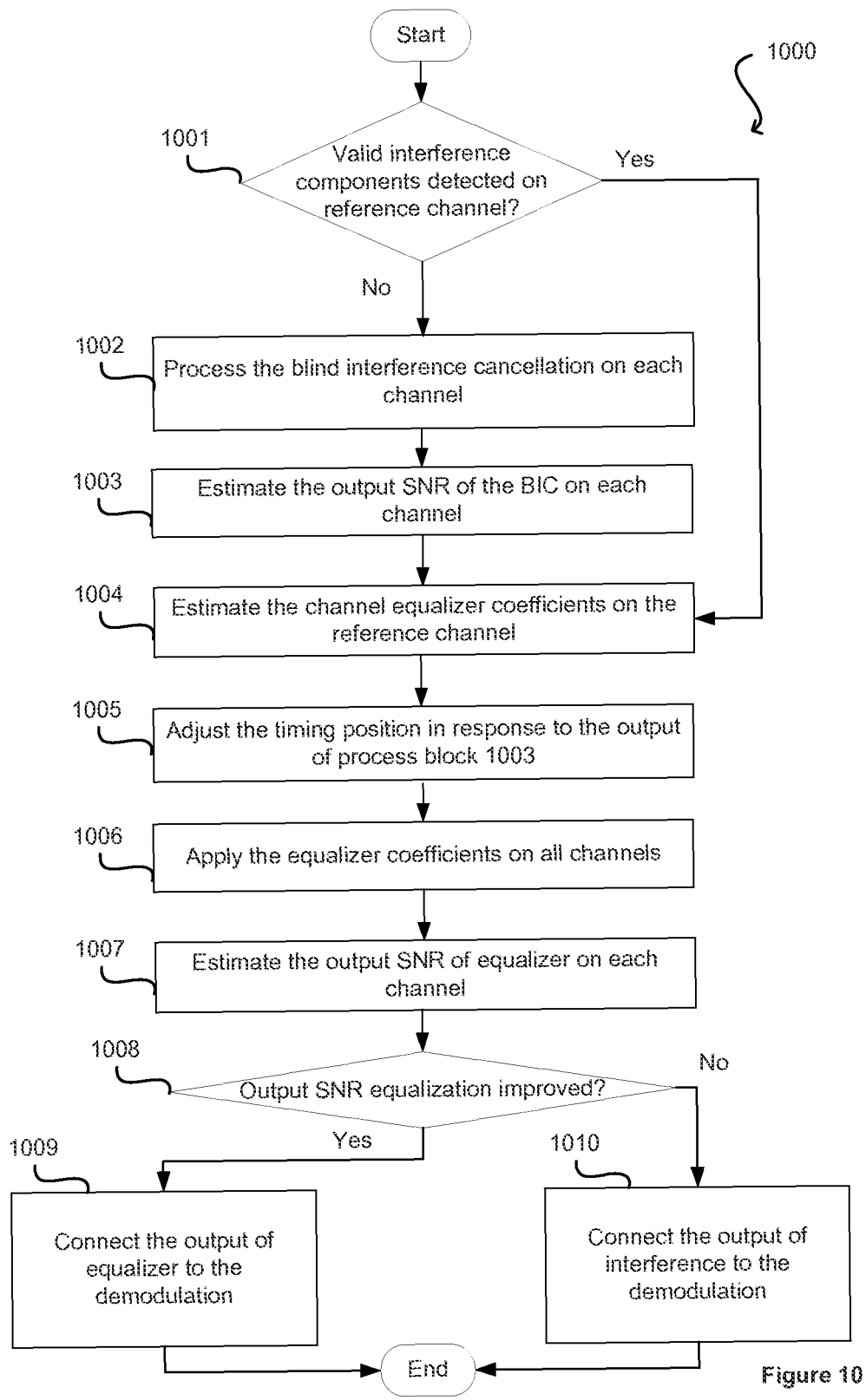
FIG. 10 illustrates a flow diagram for dynamically selecting the interference cancellation and channel equalizer, according to one embodiment of the present invention.

Referring next to FIG. 10 which illustrates a method 1000 for dynamically selecting the interference cancellation and channel equalizer, according to one embodiment of the present invention. At decision block 1001, a determination is made whether valid interference components are detected on the reference channel. If valid interference components are detected on the reference channel, then the process moves to process block 1004, otherwise the process continues to process block 1002.

At process block 1002, blind interference cancellation on each channel is processed. At process block 1003, the output SNR of the BIC on each channel are estimated. Then, the channel equalizer coefficients on the reference channel are estimated. At process block 1005, the timing position in response to the output of process block 1003 is adjusted.

At process block 1006, the equalizer coefficients on all channels are applied and the output SNR of equalizer on each channel are estimated (process block 1007). At decision block 1008, a determination of whether the SNR equalization output is improved. If the SNR equalization output is improved, then the output of equalizer to the demodulation is connected. Otherwise, the output of interference to the demodulation is connected.

Figure 11:
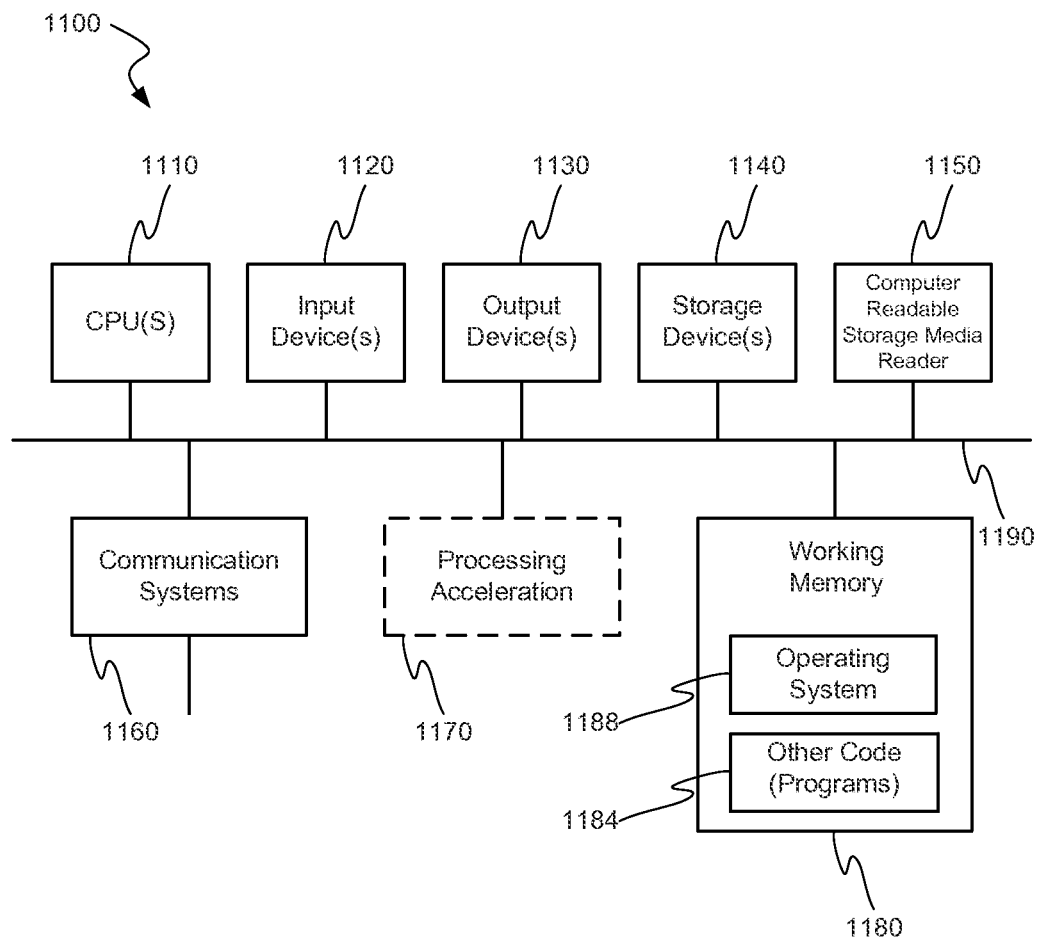
FIG. 11 is a generalized schematic diagram illustrating a computer system, in accordance with various embodiments of the invention.

FIG. 11 is a block diagram illustrating an exemplary system 1100 in which embodiments of the present invention may be implemented. For example, the system 1100 can be a wireless communication device, a portable computer with wireless communication interface, a base station, and/or others. The system 1100 is shown comprising hardware elements that may be electrically coupled via a bus 1190. The hardware elements may include one or more central processing units 1110, one or more input device(s) 1120 (e.g., keypad, etc.), and one or more output device(s) 1130 (e.g., a display device, a printer, etc.). The system 1100 may also include one or more storage device(s) 1140. By way of example, storage device(s) 1140 may be disk drives, optical storage devices, a solid-state storage device such as a random access memory ("RAM") and/or a read-only memory ("ROM"), which can be programmable, flash-updateable, and/or the like. The system 1100 is adapted to performed interference cancellation in real time. For example, the interference cancellation is performed with a latency of less than 2 ms.

The system 1100 may additionally include a computer-readable storage media reader 1150. The system 1100 includes a communication system 1160 (e.g., a modem, a network card (wireless or wired), an infra-red communication device, Bluetooth™ device, cellular communication device, etc.), and working memory 1180, which may include RAM and ROM devices as described above. For example, the communication system 1160 comprises a wireless communication interface compatible with CDMA standard. In some embodiments, the computer system 1100 may also include a processing acceleration unit 1170, which can include a digital signal processor, a special-purpose processor, and/or the like.

The computer-readable storage media reader 1150 can further be connected to a computer-readable storage medium, together (and, optionally, in combination with storage device(s) 1140) comprehensively representing remote, local, fixed, and/or removable storage devices plus storage media for temporarily and/or more permanently containing computer-readable information. The communication system 1160 may permit data to be exchanged with a wireless network, system, computer, and/or other component described above.

The system 1100 may also comprise software elements, shown as being currently located within a working memory 1180, including an operating system 1188 and/or other code 1184. It should be appreciated that alternate embodiments of a computer system 1100 may have numerous variations from that described above. For example, customized hardware might also be used and/or particular elements might be implemented in hardware, software (including portable software, such as applets), or both. Furthermore, connection to other computing devices such as network input/output and data acquisition devices may also occur.

Software of system 1100 may include code 1184 for implementing any or all of the functions of the various elements of the architecture as described herein. For example, software, stored on and/or executed by a computer system such as system 1100, can provide the functionality and/or other components of the invention such as those discussed above. Methods implementable by software on some of these components have been discussed above in more detail.

Figure 12:
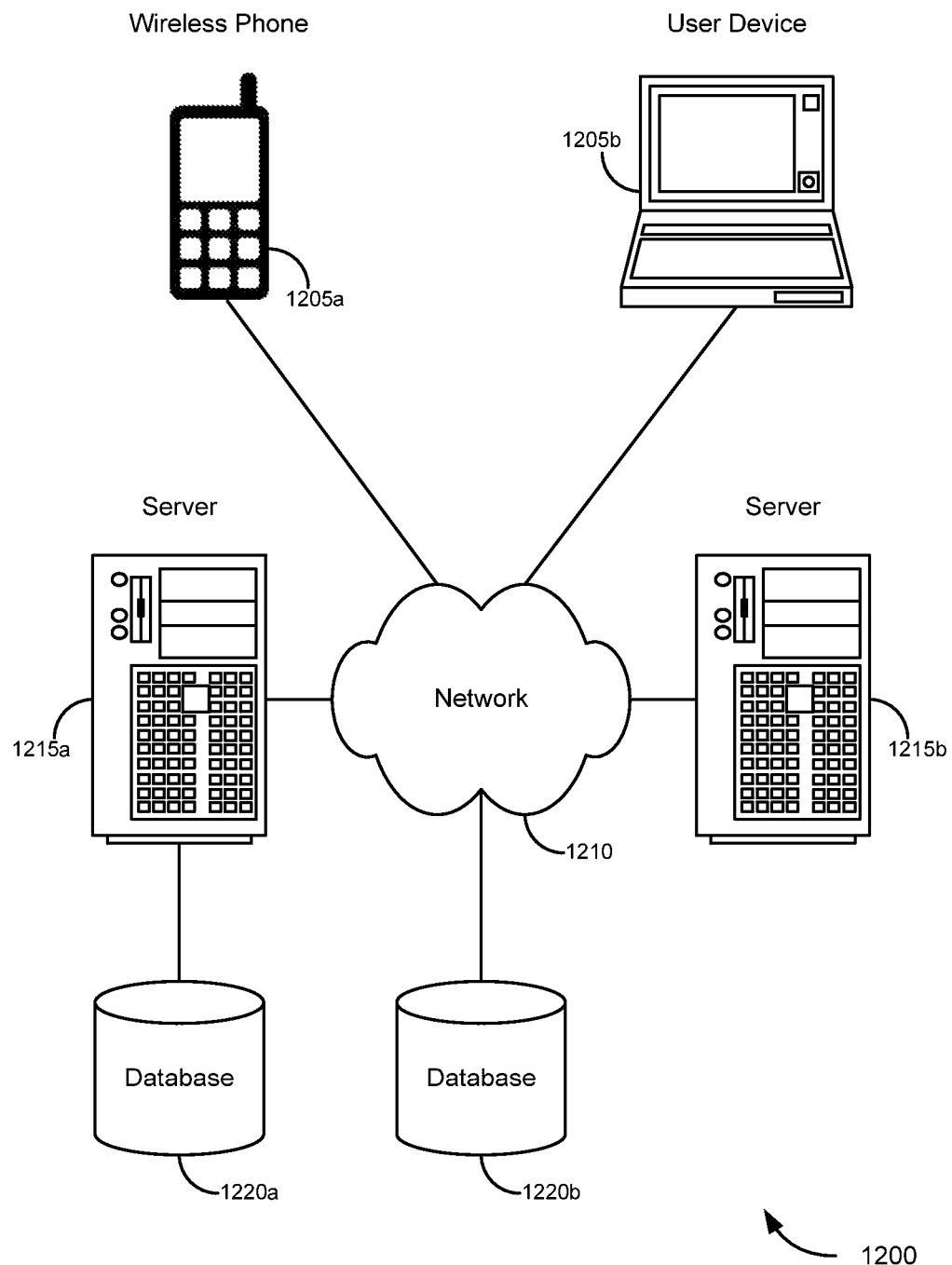
FIG. 12 is a block diagram illustrating a networked system of computers, which can be used in accordance with various embodiments of the invention.

Merely by way of example, FIG. 12 illustrates a schematic diagram of a system 1200 that can be used in accordance with one set of embodiments. The system 1200 can include one or more user devices 1205. The user devices 1205 can be general purpose personal computers (including, merely by way of example, laptop computers running any appropriate flavor of Microsoft Corp.'s Windows™ and/or Apple Corp.'s Macintosh™ operating systems) and/or workstation computers running any of a variety of commercially available UNIX™ or UNIX-like operating systems. These user computers 1205 can also have any of a variety of applications, including one or more applications configured to perform methods of the invention, as well as one or more office applications, database client and/or server applications, and web browser applications. Alternatively, the user computers 1205 can be any other electronic device, such as a thin-client computer, Internet-enabled mobile telephone, and/or personal digital assistant (PDA), capable of communicating via a wireless network (e.g., the network 1210 described below) and/or displaying and navigating web pages or other types of electronic documents. Although the exemplary system 1200 is shown with three user devices 1205, any number of user computers can be supported. For example, the user device 1205a is a wireless phone, which can be configured to performed interference cancellation described above.

Certain embodiments of the invention operate in a networked environment, which can include a network 1210. The network 1210 can be any type of network familiar to those skilled in the art that can support data communications using any of a variety of commercially available protocols, including without limitation TCP/IP, SNA, IPX, AppleTalk, and the like. Merely by way of example, the network 1210 can be a local area network ("LAN"), including without limitation an Ethernet network, a Token-Ring network, and/or the like; a wide-area network (WAN); a virtual network, including without limitation a virtual private network ("VPN"); the Internet; an intranet; an extranet; a public switched telephone network ("PSTN"); an infrared network; a wireless network, including without limitation a network operating under any of the IEEE 802.11 suite of protocols, the Bluetooth™ protocol known in the art, and/or any other wireless protocol; and/or any combination of these and/or other networks. In various embodiments, the network 1210 is a wireless communication network. For example, the network 1210 is configured to communicate using wireless communication protocols such as CDMA, GSM, and/or others.

Embodiments of the invention can include one or more server computers 1215. Each of the server computers 1215 may be configured with an operating system, including without limitation any of those discussed above, as well as any commercially (or freely) available server operating systems. Each of the servers 1215 may also be running one or more applications, which can be configured to provide services to one or more user devices 1205 and/or other server computers 1215.

Merely by way of example, one of the server computers 1215 may be a web server, which can be used, merely by way of example, to process requests for web pages or other electronic documents from user computers 1205. The web server can also run a variety of server applications, including HTTP servers, FTP servers, CGI servers, database servers, Java™ servers, and the like. In some embodiments of the invention, the web server may be configured to serve web pages that can be operated within a web browser on one or more of the user computers 1205 to perform methods of the invention.

The server computers 1215, in some embodiments, might include one or more application servers, which can include one or more applications accessible by a client running on one or more of the user computers 1205 and/or other server computers 1215. Merely by way of example, the server computers 1215 can be one or more general purpose computers capable of executing programs or scripts in response to the user computers 1205 and/or other server computers 1215, including without limitation web applications (which might, in some cases, be configured to perform methods of the invention). Merely by way of example, a web application can be implemented as one or more scripts or programs written in any suitable programming language, such as Java™, C, C#™ or C++, and/or any scripting language, such as Perl, Python, or TCL, as well as combinations of any programming/scripting languages. The application server(s) can also include database servers, including without limitation those commercially available from Oracle™, Microsoft™. Sybase™, IBM™ and the like, which can process requests from clients (including, depending on the configuration, database clients, API clients, web browsers, etc.) running on a user computer 1205 and/or another server computer 1215. In some embodiments, an application server can create web pages dynamically for displaying the information in accordance with embodiments of the invention. Data provided by an application server may be formatted as web pages (comprising HTML, Javascript, etc., for example) and/or may be forwarded to a user computer 1205 via a web server (as described above, for example). Similarly, a web server might receive web page requests and/or input data from a user computer 1205 and/or forward the web page requests and/or input data to an application server. In some cases, a web server may be integrated with an application server.

In accordance with further embodiments, one or more server computers 1215 can function as a file server and/or can include one or more of the files (e.g., application code, data files, etc.) necessary to implement methods of the invention incorporated by an application running on a user computer 1205 and/o another server computer 1215. Alternatively, as those skilled in the art will appreciate, a file server can include all necessary files, allowing such an application to be invoked remotely by a user computer 1205 and/or server computer 1215. It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more database(s) 1220. The location of the database(s) 1220 is discretionary. Merely by way of example, a database 1220a might reside on a storage medium local to (and/or resident in) a server computer 1215a (and/or a user computer 1205). Alternatively, a database 1220b can be remote from any or all of the computers 1205, 1215, so long as the database can be in communication via the network 1210) with one or more of these. In a particular set of embodiments, a database 1220 can reside in a storage-area network ("SAN") familiar to those skilled in the art. (Likewise, any necessary files for performing the functions attributed to the computers 1205, 1215 can be stored locally on the respective computer and/or remotely, as appropriate.) in one set of embodiments, the database 1220 can be a relational database, such as an Oracle™ database, that is adapted to store, update, and retrieve data in response to SQL-formatted commands. The database might be controlled and/or maintained by a database server, as described above, for example.

The invention has now been described in detail for the purposes of clarity and understanding. However, it will be appreciated that certain changes and modifications may be practiced within the scope of the appended claims.

What is claimed:

1. A system for canceling interference in wireless communication, the system comprising:
   a non-transitory computer-readable storage device; and
   a processor in communication with the non-transitory computer-readable storage device, wherein the non-transitory computer-readable storage device has sets of instructions stored thereon which, when executed by the processor, cause the processor to:
   receive wireless code division multiple access (CDMA) communication signals using one or more antennas via a first communication channel and via a second communication channel,
   determine a set of known characteristics associated with communication signals from the first communication channel, the first set of characteristics comprising a first signal strength, a first synchronization information, and a first channel identification information,
   determine an aggregate signal matrix based on noise and communication signals received from the first communication channel and the second communication channel,
   determine a covariance matrix associated with an aggregate signal value,
   determine a reference signal matrix based on the set of known characteristics,
   calculate an interference matrix by subtracting the reference signal matrix from the covariance matrix,
   determine a maximum eigenvalue and an eigenvector corresponding to the maximum eigenvalue for the interference matrix,
   generate an interference estimation using the maximum eigenvalue and the eigenvector, and
   remove the interference estimation from the communication signals.

2. The system of claim 1, wherein the sets of instruction when further executed by the processor, cause the processor to perform recursive calculations with a threshold condition to determine the maximum eigenvalue.

3. The system of claim 2, wherein the threshold is determined based on a desired signal-to-noise ratio and the correlation feature of a designed signature code.

4. The system of claim 1, wherein the channel identification information comprises a signature (spreading) code, scrambling code, in orthogonal code, or non-orthogonal code.

5. The system of claim 1, wherein the reference signal matrix is associated with covariance values of the set of known characteristics.

6. The system of claim 1, wherein the wireless communication CDMA signals includes interference signals.

7. A non-transitory computer-readable medium for updating user assistance content, having sets of instructions stored thereon which, when executed by a computer, cause the computer to:
   receive wireless code division multiple access (CDMA) communication signals using one or more antennas via a first communication channel and via a second communication channel;
   determine a set of known characteristics associated with communication signals from the first communication channel, the first set of characteristics comprising a first signal strength, a first synchronization information, and a first channel identification information;
   determine an aggregate signal matrix based on noise and communication signals received from the first communication channel and the second communication channel;
   determine a covariance matrix associated with an aggregate signal value;
   determine a reference signal matrix based on the set of known characteristics;
   calculate an interference matrix by subtracting the reference signal matrix from the covariance matrix;
   determine a maximum eigenvalue and an eigenvector corresponding to the maximum eigenvalue for with the interference matrix;
   generate an interference estimation using the maximum eigenvalue and the eigenvector; and
   remove the interference estimation from the communication signals.

8. The non-transitory computer-readable medium of claim 7, wherein the sets of instruction when further executed by the computer, cause the computer to perform recursive calculations with a threshold condition to determine the maximum eigenvalue.

9. The non-transitory computer-readable medium of claim 8, wherein the threshold is determined based on a desired signal-to-noise ratio and the correlation feature of a designed signature code.

10. The non-transitory computer-readable medium of claim 7, wherein the channel identification information comprises a signature (spreading) code, scrambling code, in orthogonal code, or non-orthogonal code.

11. The non-transitory computer-readable medium of claim 7, wherein the reference signal matrix is associated with covariance values of the set of known characteristics.

12. The non-transitory computer-readable medium of claim 7, wherein the wireless communication CDMA signals includes interference signals.

* * * * *